United States Patent Office 3,260,720
Patented July 12, 1966

3,260,720
PROCESS OF PREPARING 2-AMINOQUINOXALINE
Edward W. Berndt, Charles City, Iowa, assignor to Salsbury Laboratories, a corporation of Iowa
No Drawing. Filed May 31, 1963, Ser. No. 284,332
8 Claims. (Cl. 260—250)

This invention relates to an improved process of preparing 2-aminoquinoxaline and intermediates leading to the formation of that compound. 2-aminoquinoxaline is the most expedient precursor of sulfaquinoxaline for purposes of commercial production and the sulfa derivative is a known bacteriostat of manifold use in animal therapy. The synthesis of 2-sulfaquinoxaline from 2-aminoquinoxaline has been described by Weijlard et al. in the Journal of the American Chemical Society, vol. 66 (1944), pp. 1957 ff.

In view of the practical usefulness of 2-aminoquinoxaline in the preparation of the sulfa drug a considerable number of methods have been devised by which 2-aminoquinoxaline can be produced. In accordance with one suggestion, the compound has been made by fission of alloxazine in concentrated ammonia followed by decarboxylation. Apart from the tediousness of this operation which must be carried out under pressure in a closed vessel and at elevated temperatures, the raw material alloxazine is a scarce and costly commodity. It has also been proposed to start the synthesis with the readily available o-phenylenediamine converting the same by reaction with glyoxalic acid derivatives and sodium bisulfite to 2-hydroxyquinoxaline, exchanging the hydroxy group in the latter for a halogen and finally transforming the 2-haloquinoxaline under heat and pressure into the corresponding 2-amino compound. This procedure has the drawback at it requires the inconvenient use of the pungent and irritating phosphorous chlorides for the purpose of halogenation, followed by the no less laborious amination step which calls for the employment of an inert organic solvent and special operating conditions for the regulation of pressure and temperature.

Another method of preparing 2-aminoquinoxaline, described in Patent No. 2,650,221, consists in the formation of N(o-aminophenyl) glycine nitrile from o-phenylenediamine, cyclizing the intermediate into 2-amino-3,4-dihydroquinoxaline and oxidizing the latter into the desired 2-aminoquinoxaline. The first step of this process may be carried out with formaldehyde and hydrocyanic acid, or with a haloacetonitrile, or with glyconitrile. While the use of sodium cyanide or hydrocyanic acid and formaldehyde seems to be the method of choice from the standpoint of cheapness and availability of these materials, the use of large amounts of cyanides is potentially hazardous in commercial operations. Furthermore, the pH and the quantities of reactants must be carefully controlled in order to obtain the desired N-(o-aminophenyl) glycine nitrile. Even when the reaction proceeds well, substantial amounts of by-products are encountered.

Further hazards are presented during the cyclization of N-(o-aminophenyl) glycine nitrile. Considerable amounts of anhydrous methanol are required for this step as this solvent appears to be an essential and irreplacable reaction medium in this procedure. The vapor of methanol is very toxic and this solvent also has a low flash point. Both of these factors are disadvantages in using it for large scale manufacturing purposes. Water present in amounts of as little as 1% in the methanol substantially lowers the yields so that the cyclization must be conducted under virtually anhydrous conditions.

I have now discovered that 2-aminoquinoxaline can be prepared by a simple and economical method which is not subject to the foregoing shortcomings and, considering the commercial availability and inexpensiveness of the raw materials, produces gratifying yields for the purposes of commercial manufacture.

My novel process may be characterized by the following chemical equations:

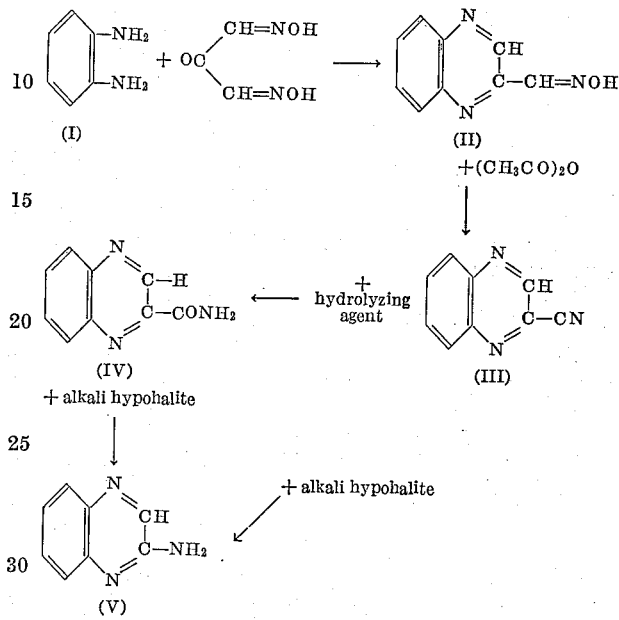

As outlined in the foregoing diagram, o-phenylenediamine (I) is first reacted with diisonitrosacetone to form 2-isonitrosomethylquinoxaline (II). This compound is thereupon treated with acetic anhydride and converted to 2-quinoxalinenitrile (III) which constitutes a novel and valuable intermediate in the formation of 2-quinoxalinecarboxamide (IV), the direct precursor of the desired 2-aminoquinoxaline (V). The conversion of compound III to compound IV is carried out with an alkaline solution of hydrogen peroxide or a catalytic agent as hereinafter explained in greater detail, and the carboxamide (IV) or nitrile (III) is subsequently reacted with an alkali hypochlorite or hypobromite to form the 2-aminoquinoxaline (V).

More particularly, the first step in my new and improved process leading to the 2-isonitrosomethylquinoxaline (II) is accomplished in accordance with the procedure of P. Karrer and R. Schwyzer described in Helv. Chim. Acta, vol. 31, 777–782 (1948). The o-phenylenediamine (I) is dissolved in an approximately tenfold amount of 5% acetic acid and at about 35° C. is added with diisonitrosoacetone and water. The 2-isonitrosomethylquinoxaline (II) precipitates from the solution after standing for several minutes. To complete the reaction the mixture is warmed to about 45° C. for thirty minutes and after standing the 2-isonitrosomethylquinoxaline (II) is recovered by filtration. The compound is identified by Karrer and Schwyzer as 2-(oximinomethyl) quinoxaline. While these workers prefer to carry out the operation under nitrogen, it has been found that this is not essential.

The 2-quinoxaline nitrile (III) is obtained by dehydration of the 2-isonitrosomethylquinoxaline (II). The most convenient dehydration agent is acetic anhydride which serves as a solvent medium and is thereafter removed by distillation. Instead of acetic anhydride, however, other known dehydrants such as phosphorous pentachloride, phosphorous pentasulfide and phosphorous pentoxide, various organic acid anhydrides and catalytic agents may be employed. It was discovered that when 2-isonitrosomethylquinoxaline (II) was refluxed for less than 2 hours with acetic anhydride, a compound was formed in good yield which was isolated as crystalline plates, M.P. 155–158° C. This intermediate compound probably is 2-quinoxalinecarboxaldehyde acetyloxime. Somewhat longer reflux periods gave impure mixtures. Reaction times of several hours, it was found, gave very good yields of the desired nitrile (III). The 2-isonitrosomethylquinoxaline (II) is refluxed in the dehydrating medium for about six hours and the distillation of most of the remaining acetic anhydride followed by the dilution of the residue with water yields lumps of the nitrile (III) which is collected on a filter and purified. The crude product has a melting point of 108–116.5° C. When purified by vacuum distillation, followed by sublimation and repeated crystallization from methanol, the product accrues in fine white needles with a melting point of 122.5–122.9° C.

The conversion of 2-quinoxalinenitrile (III) to 2-quinoxalinecarboxamide (IV) readily proceeds with mild conditions. The hydration probably proceeds by way of the intermediate imide according to the general equation:

This reaction may be carried out with alkaline hydrogen peroxide at an approximate temperature of 45 to 55° C. The nitrile (III) is dissolved in an inert organic solvent such as acetone and added with the peroxide solution and an alkali carbonate. This initiates an exothermic reaction resulting in the precipitation of 2-quinoxalinecarboxamide (IV) in the form of a yellow powder with a melting point in the neighborhood of 200° C.

Instead of the alkaline peroxide, the amidation of the nitrile (III) may also be conveniently accomplished by the use of an ion-exchange basic resin as a catalytic agent, such as water-insoluble polymers containing quaternary ammonium groups. One of the preferred species of this type of catalysts is IRA–400 which is manufactured by the Rohm and Haas Company. In preparation for use, the resin is treated with dilute alkali to form a resin base and thereupon washed free of sodium chloride and an excess of the alkali. When so employed, the resin is added to the nitrile (III) in an aqueous solution and the mixture is refluxed for approximately one hour. After extraction with an organic solvent such as acetone and filtration the resulting filtrate is evaporated to dryness and yields 2-quinoxalinecarboxamide (IV) with a melting point of 202–203° C.

As a third alternative the nitrile may also be hydrolyzed by heating in concentrated hydrochloric acid until it is completely dissolved. In contact with ice precipitation of the carboxamide (IV) occurs which after washing and drying registers a melting point of 203° to 204° C.

The final step of decarboxylation of the carboxamide (IV) to convert the same to 2-aminoquinoxaline (V) is accomplished by means of the Hofmann reaction. The method consists in treating the 2-quinoxalinecarboxamide (IV) with an alkali hypochlorite or hypobromite solution. For instance, I may employ a sodium hypochlorite solution which is prepared by adding approximately 5% sodium hypochlorite solution to 12% sodium hydroxide. When 2-quinoxaline carboxamide (IV) is treated with this reagent, a dark liquid is gradually formed which, after filtration and warming to about 75° C. and subsequent cooling, yields a crude solid of greyish color with a melting point in the neighborhood of 151° C. Alternatively, I may also carry out the reaction by using sodium hypobromite. The reagent is prepared by the dropwise addition of bromine to 12% sodium hydroxide. The amide (IV) is then treated with this solution at a temperature from −5° C. to 0° C. for one and a half hours. The mixture is filtered, the filtrate heated and upon cooling extracted with an inert organic solvent such as chloroform which dissolves the 2-aminoquinoxaline (V) and yields the same upon evaporation as a yellow solid with a melting point of 149°–153° C.

As a further variation of my improved process, I may also directly convert the 2-quinoxalinenitrile (III) to 2-aminoquinoxaline (V) without separating the intermediate carboxamide (IV) from the solution. To this effect the nitrile is treated with an alkaline solution of an alkali hypohalite in a manner similar to the conversion of the amide to 2-aminoquinoxaline. This modification considerably simplifies the procedure by eliminating the recovery of the carboxamide (IV) and renders it still more economical by reducing the needs for capital investment and labor and by improving the yields otherwise affected by the process of isolation.

The following examples will demonstrate more particularly the practical embodiments of my invention, but it will be understood that they are given merely for the purpose of illustration without limiting the broader purview of my inventive concept within which I may resort to numerous modifications and variations which are obvious to a skilled worker in the art.

EXAMPLE 1

*2-isonitrosomethylquinoxaline*

A solution of 138 g. (1.28 moles) of o-phenylenediamine, 1300 cc. of water and 65 cc. of glacial acetic acid was prepared by warming the mixture and then cooling it to 35° C. To this solution approximately 95 g. of diisonitrosoacetone (v. Koessler and Hanke, J. Am. Chem. Soc., vol. 40, 1717–26 (1918)) and 1300 cc. of water were added. Within a few minutes a voluminous tan colored precipitate was formed. The reaction was completed by warming to 45° C. for 30 minutes. After standing overnight at room temperature, the precipitate was collected on a filter, washed with cold water and dried at 60–65° C. The crude product weighed 145 g. and had a melting point of 190–194° C. It was purified by recrystallization from a mixture of methanol and water. The dry substance weighed 108 g. and showed a melting point of 203–205° C.

EXAMPLE 2

*2-quinoxalinenitrile*

A solution of 86.5 g. (0.5 mole) of 2-isonitrosomethylquinoxaline, M.P. 202–205° C., in 250 cc. of acetic anhydride was refluxed for 6 hours and thereupon the major portion of the excess acetic anhydride was distilled. The remaining dark liquid was added to 200 cc. of ice-water and the lumps of solid that formed were crushed. The brown solid mass was collected on a filter, thoroughly washed with water and dried at 85° C. The product weighed 73.0 g. (94%) and had a melting point of 108–116.5° C. A sample was purified by vacuum distillation, followed by sublimation and repeated crystallization from methanol. It was obtained as fine white needles and had a melting point of 122.5–122.9° C. Analysis of the 2-quinoxalinenitrile (III) $C_9H_5N_3$ gave the following values:

Calculated: C, 69.67; H, 3.24; N, 27.09. Found: C, 69.68; H, 3.34; N, 27.36.

Upon warming a sample of 2-quinoxalinenitrile with sodium hydroxide solution, ammonia was rapidly liberated and the nitrile dissolved with the formation of sodium 2-quinoxalinecarboxylate.

EXAMPLE 3

*2-quinoxalinecarboxamide*

A solution of 3.1 g. (0.02 mole) of crude 2-quinoxalinenitrile, M.P. 106–114° C., was prepared in 75 cc. of acetone and thereupon 15 cc. of 10% sodium carbonate, 10 cc. of water and 5 cc. of 30% hydrogen peroxide were added. An exothermic reaction with the evolution of gas occurred within a few minutes and crystallization set in shortly thereafter. Most of the acetone was evaporated and the solid was collected on a filter, washed with water and dried at 85° C. The light yellow powder of 2-quinoxalinecarboxamide weighed 2.7 g. and represented a yield of 76% of theory. It had a melting point of 199–201° C. A mixed melting point with authentic 2-quinoxalinecarboxamide was not depressed.

Authentic 2-quinoxalinecarboxamide was prepared in the following manner. The acid chloride of 2-quinoxalinecarboxylic acid was obtained by refluxing 10.4 g. (0.06 mole) of the acid in 200 cc. of thionyl chloride for 2 hours. Most of the excess thionyl chloride was vacuum distilled and the brown solution that remained was slowly added to 100 cc. of concentrated ammonia. The mixture was then cooled and the product collected on a filter. After washing with water and drying, the crude purple amide weighed 7.7 g. and had a melting point of 197–200° C. A sample of this compound was purified by repeated crystallization from chloroform, then once again from ethanol and finally from chloroform. The purified material had the appearance of white needles and a melting point of 202.2 to 203° C. Analysis of the product with the molecular formula $C_9H_7N_3O$ gave the following values:

Calculated: C, 62.42; H, 4.07; N, 24.27. Found: C, 62.45; H, 4.09; N, 24.45.

EXAMPLE 4

2-quinoxalinecarboxamide

Two grams of Amberlite IRA–400 resin was slurried with 5% sodium hydroxide and then washed several times with distilled water. This material was added to 1.5 g. (0.01 mole) of 2-quinoxalinenitrile and 10 cc. of water. The mixture was refluxed for one hour, filtered and washed with water. The solids were extracted with acetone and filtered. The filtrate was evaporated to dryness, yielding 1.0 g. (58%) of 2-quinoxalinecarboxamide having a melting point of 202–203° C.

EXAMPLE 5

2-quinoxalinecarboxamide

A small quantity of 2-quinoxalinenitrile was converted to the amide by heating in concentrated hydrochloric acid. After the nitrile was completely dissolved, ice was added to precipitate the carboxamide. The product was washed and dried and registered a melting point of 203–204° C.

EXAMPLE 6

2-aminoquinoxaline

A solution of 2.4 g. of sodium hydroxide in 20 cc. of water was prepared and cooled to 5° C. This solution was mixed with 30 g. of cold Hi-lex bleach containing at least 5.25% sodium hypochlorite by weight. 3.4 g. (0.02 mole) of finely divided 2-quinoxalinecarboxamide, M.P. 198–202° C., were introduced into this cold solution which was then stirred for 4 hours. The dark mixture which had warmed to 20° C. was filtered from a small amount of insoluble material. The filtrate was heated to 75° C. and held at this temperature for 15 minutes. The solution was cooled to about 5° C. and left standing overnight whereupon a grey solid precipitated which was collected on a filter, washed with water and dried. It weighed 2.4 g. and had a melting point of 153–157° C. The filtrate was extracted three times with 50 cc. portions of chloroform. Upon evaporating the combined chloroform fractions to dryness, an additional 0.2 g. of a dark yellow product with a melting point of 145–151° C. was obtained. The total yield of crude 2-aminoquinoxaline amounted to 2.6 g. or 90% of the theory. A small amount of the first crop of 2-aminoquinoxaline was acetylated by warming with acetic anhydride. The solid obtained from the reaction was of a light yellow color and had a melting point of 191.5 to 193° C. as reported by Weijlard et al. in J. Am. Chem. Soc., 66, pp. 1957–8 (1944).

EXAMPLE 7

2-aminoquinoxaline

A solution of 4.8 g. of sodium hydroxide in 40 cc. of water was cooled below 0° C. and 1.2 cc. of bromine was added dropwise. Into this solution 3.4 g. (0.02 mole) of 2-quinoxalinecarboxamide were introduced and the mixture was stirred at −5° C. to 0° C. for 1.5 hours. The solution was filtered and the filtrate was warmed to 75–80° C. for 15 minutes. After the solution had cooled, it was extracted 4 times with small portions of chloroform. The combined chloroform extracts were evaporated to dryness, leaving 1.2 g. of a yellow solid with a melting point of 149–153° C. The aqueous solution after the extraction with chloroform contained some suspended dark brown solids. The solids which were filtered and dried weighed 1.25 g. and had a melting point of 149–153° C. The total yield of crude 2-aminoquinoxaline was 2.45 g. or 85% of theory.

EXAMPLE 8

2-aminoquinoxaline

A solution of 3.6 g. of sodium hydroxide in 30 cc. of water was prepared and 45 cc. of cold Hi-lex bleach was added. Then 4.7 g. (0.03 mole) of 2-quinoxalinenitrile, M.P. 119–122° C., was added. The mixture was heated to 70–75° C. for 1 hour with stirring. After cooling, the solid was collected on a filter and washed well with small portions of cold water. The light tan solid, after drying at 80° C., weighed 3.8 g., M.P. 154–156° C.

The dark red aqueous mother liquor was concentrated by heating on a steam cone for 1 hour. It was then acidified with hydrochloric acid and finally made slightly basic by the addition of sodium hydroxide solution. This solution was then extracted with chloroform and the extracts were combined and evaporated to dryness, leaving 0.2 g. of light yellow product, M.P. 150–152° C. The total yield of 2-aminoquinoxaline was 91% of theory.

Some of the first crop of product was acetylated by warming with acetic anhydride and evaporating to dryness. The light yellow crystalline residue had a melting point of 190–193° C.

EXAMPLE 9

2-aminoquinoxaline

A cold solution of 1.2 g. of sodium hydroxide in 10 cc. of water was prepared and allowed to cool. Then 15 cc. of cold Hi-lex bleach and 1.4 g. (0.009 mole) of 2-quinoxalinenitrile, M.P. 118–120° C., were added to the alkaline solution. This mixture was kept at 5–7° C. for 1 hour with occasional stirring. The mixture was then gradually warmed to 50° and after 15 minutes at this temperature was heated to 70–75° C. for 15 minutes. The mixture was cooled for 1 hour and the solid was collected on a filter and washed with some water. After drying, the light brown powder weighed 0.6 g., M.P. 153–156° C. By extracting the aqueous filtrate with chloroform several times and evaporating the combined chloroform extracts to dryness, an additional 0.4 g. of light yellow needles, M.P. 153–155° C., was obtained.

The dark red aqueous filtrate was concentrated on a steam cone to about 25 cc. and cooled well. The mass of tan needles that formed was collected on a filtrate and sucked free of mother liquor. The crystals were slurried with a little water and then acidified with concentrated hydrochloric acid. After warming for 10 minutes, the solution was basified with dilute sodium hydroxide. The heavy precipitate that formed was filtered, washed with a little water and dried. The fine pale tan needles weighed 0.3 g., M.P. 154–155° C. The yield was essentially quantitative.

What I claim is:

1. The process of preparing 2-aminoquinoxaline comprising the steps of reacting o-phenylenediamine with di-isonitrosoacetone to form 2-isonitrosomethylquinoxaline, treating this compound with a dehydrating agent to produce 2-quinoxalinenitrile, subjecting said nitrile to a hydrolysis so as to form 2-quinoxalinecarboxamide, and finally converting said carboxamide to 2-aminoquinoxaline by treating it with an alkaline hypohalite.

2. The process of preparing 2-aminoquinoxaline comprising the step of reacting 2-quinoxalinenitrile with a hydrolyzing agent to form 2-quinoxalinecarboxamide and converting said carboxamide to 2-aminoquinoxaline by treating it with an alkaline hypohalite.

3. The process as defined in claim 2 wherein the hydrolyzing agent is an alkaline hydrogen peroxide solution.

4. The process as defined in claim 2 wherein the hydrolyzing agent is an ion-exchange resin base which has been freed from sodium chloride and excess alkali.

5. The process of preparing 2-aminoquinoxaline which comprises the step of reacting 2-quinoxalinecarboxamide with an alkaline solution of an alkali hypohalite.

6. The process as defined in claim 5 wherein the alkali hypohalite is sodium hypochlorite.

7. The process of preparing 2-aminoquinoxaline which comprises the step of reacting 2-quinoxalinenitrile in the presence of an alkaline solution of an alkali hypohalite.

8. As a new composition of matter the compound 2-quinoxalinenitrile having the configuration

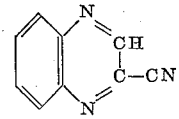

forming a white crystalline solid and having a melting point of approximately 122.5–122.9° C.

No references cited.

NICHOLAS S. RIZZO, *Primary Examiner*.